United States Patent [19]

Tanaka

[11] Patent Number: 5,020,864
[45] Date of Patent: Jun. 4, 1991

[54] BRAKING SYSTEM FOR VEHICLE

[75] Inventor: Ryuichi Tanaka, Kanagawa, Japan

[73] Assignee: Nippon Air Brake Co., Kobe, Japan

[21] Appl. No.: 394,009

[22] Filed: Aug. 15, 1989

[30] Foreign Application Priority Data

Sep. 20, 1988 [JP] Japan .................. 63-235767

[51] Int. Cl.$^5$ .......................... B60T 17/18; B60T 8/40
[52] U.S. Cl. ...................................... 303/113; 303/68; 303/84.1; 303/87
[58] Field of Search ............... 303/110, 113, 114, 115, 303/116, 117, 87, 84.2

[56] References Cited

U.S. PATENT DOCUMENTS

| | | | |
|---|---|---|---|
| 2,770,948 | 11/1956 | Porter | 303/84.1 |
| 4,395,073 | 7/1983 | Arikawa et al. | 303/116 |
| 4,453,782 | 6/1984 | Arikawa et al. | 303/116 |
| 4,765,692 | 8/1988 | Miyake | 303/68 X |
| 4,812,777 | 3/1989 | Shirai | 303/87 |

FOREIGN PATENT DOCUMENTS

| | | | |
|---|---|---|---|
| 3428573 | 3/1985 | Fed. Rep. of Germany | 303/113 |
| 0078858 | 4/1988 | Japan | 303/110 |
| 2187521 | 9/1987 | United Kingdom | 303/114 |

*Primary Examiner*—Matthew C. Graham
*Attorney, Agent, or Firm*—Jones, Day, Reavis & Pogue

[57] ABSTRACT

A braking system for a vehicle is disclosed which includes a master cylinder, a wheel cylinder for braking a wheel or wheels with the brake fluid pressure supplied from the master cylinder and a pulsating-pressure absorbing apparatus arranged between the master cylinder and the wheel cylinder. The pulsating-pressure absorbing apparatus includes a throttle for limiting the brake fluid flowing from the side of the wheel cylinder towards the master cylinder and a plunger arranged between the inlet and outlet of the main body. The plunger is movable in response to the brake fluid pressure difference between both sdes of the plunger. When the plunger is located at the first side of the outlet, the throttle becomes operative and when the plunger is located at the second side of the inlet, the throttle becomes inoperative.

10 Claims, 3 Drawing Sheets

BRAKING SYSTEM FOR VEHICLE

BACKGROUND OF THE INVENTION

1. Field of the Invention:

This invention relates to a braking system for vehicle, and more particularly to a braking system for vehicle in which the transmission of the pulsating pressure from the brake circuit to the fluid-pressure generating source or master cylinder is limited.

2. Description of the Prior Art:

For example, the Japanese Patent Opening Gazzette No. 142733/1981 discloses the braking system for vehicle which includes: a brake fluid pressure generating source: a brake-applying apparatus for braking a wheel or wheels with the brake fluid pressure supplied from the brake fluid pressure generating source; a pulsating-pressure absorbing apparatus arranged between the brake fluid pressure generating source and the brake-applying apparatus; and throtting means arranged in the pulsating-pressure absorbing apparatus, for limiting the brake fluid flowing from the side of the brake-applying apparatus towards the brake fluid pressure generating source. Or it discloses the braking system for vehicle which includes; a master cylinder: a wheel cylinder for braking a wheel with the brake fluid pressure supplied from the master cylinder; an anti-skid control valve apparatus being arranged between the master cylinder and the wheel cylinder and changed over in accordance with the instructions generated from a control unit for evaluating or measuring a skid condition or behavior of the wheel; a brake relieving circuit one end of which communicates with the master cylinder and another end of which communicates with the anti-skid control valve apparatus, a fluid pressure pump being arranged in the brake relieving circuit, for pressurizing and returning the brake fluid discharged through the anti-skid control valve apparatus from the wheel cylinder; a pulsating-pressure absorbing apparatus being arranged between the fluid pressure pump and the master cylinder, for limitting the transmission of the pulsating pressure of the fluid pressure pump; and throtting means arranged in the pulsating-pressure absorbing apparatus, for limit-ting the brake fluid flowing from the side of the fluid pressure pump towards the master cylinder. In the above-described braking system, the throttle is fixed. It limits the transmission of the pulsating pressure of the fluid pressure pump, to the master cylinder. Further, there is provided a check valve which inhibits brake fluid from flowing towards the master cylinder from the fluid pressure pump side. Accordingly, a second check valve is required for brake-relieving, and it permits brake fluid to flow from the wheel cylinder side to the master cylinder side.

Further in the above-described braking system, it is preferable that the throttle is arranged nearer to the master cylinder and that the distance between the generating source of the pulsating pressure and the throttle, and the volume of the conduit between them is larger, since the transmission of the pulsating pressure of the fluid pressure pump or of the pulsating pressure generating in the brake circuit, to the master cylinder can be effectively decreased. Accordingly, it is considered that the throttle is arranged at the outlet of the master cylinder. However, the throttling effect occurs both on the braking application and on the brake relief. The throttle has bad influence both on the braking application and on the brake relief. Accordingly, it is required that the throttle is effective only for the fluid flowing towards the master cylinder, and a check valve which permits fluid to flow out from the outlet of the master cylinder, is provided. In that case, another check valve for brake relieving is required.

Thus, the braking system for vehicle is large-sized and complicated. The conduit construction is complicated, too. The assembling step is troublesome.

SUMMARY OF THE INVENTION

It is an object of this invention to provide a braking system for vehicle in which the conduit construction is not complicated by the arrangement position of the throttle for absorbing the pulsating pressure, and the proper function of the braking operation is not deteriorated thereby.

In accordance with an aspect of this invention, a braking system for vehicle includes:(A) a brake fluid pressure generating source; (B) a brake-applying apparatus for braking a wheel or wheels with the brake fluid pressure supplied from said brake fluid pressure generating source; (C) a pulsating-pressure absorbing apparatus arranged between said brake fluid pressure generating source and said brake-applying apparatus; and (D) throttling means arranged in said pulsating-pressure absorbing apparatus, for limiting the brake fluid flowing from the side of said brake-applying apparatus towards said brake fluid pressure generating source, and said pulsating-pressure absorbing apparatus includes a movable member arranged between the inlet and outlet of said pulsating-pressure absorbing apparatus, and being movable in responce to the flow of said brake fluid or the brake fluid pressure difference between both sides of said movable member, and when said movable member is located at the first side of said outlet, said throttling means becomes operative and when said movable member is located at the second side of said inlet, said throttling means becomes inoperative.

In accordance with another aspect of this invention, a braking system for vehicle includes; (A) a master cylinder; (B) a wheel cylinder for braking a wheel with the brake fluid pressure supplied from said master cylinder; (C) an anti-skid control valve apparatus being arranged between said master cylinder and said wheel cylinder and changed over in accordance with the instructions generated from a control unit for evaluating or measuring a skid condition or behavior of said wheel; (D) a brake relieving circuit one end of which communicates with said master cylinder and another end of which communicates with said anti-skid control valve apparatus; (E) a fluid pressure pump being arranged in said brake relieving circuit, for pressurizing and returning the brake fluid discharged through said anti-skid control valve apparatus from said wheel cylinder; (F) a pulsating-pressure absorbing apparatus being arranged between said fluid pressure pump and said master cylinder, for limitting the transmission of the pulsating pressure of said fluid pressure pump; and (G) throttling means arranged in said pulsating-pressure absorbing apparatus, for limiting the brake fluid flowing from the side of said fluid pressure pump towards said master cylinder, and said pulsating-pressure absorbing apparatus includes a movable member arranged between the inlet and outlet of said pulsating-pressure absorbing apparatus, and being movable in responce to the flow of said brake fluid or the brake fluid pressure difference between both sides of said movable member, and when said movable member is located at the first side of said outlet, said throttling means becomes operative and when said movable member is located at the second side of said inlet, said throttling means becomes inoperative.

The foregoing and other objects, features, and advantages of the present invention will be more readily understood upon consideration of the following detailed description of the preferred embodiments of the invention, taken in conjunction with the accompanying drawings.

DESCRIPTION OF THE PREFERRED EMBODIMENTS

Figure 1:
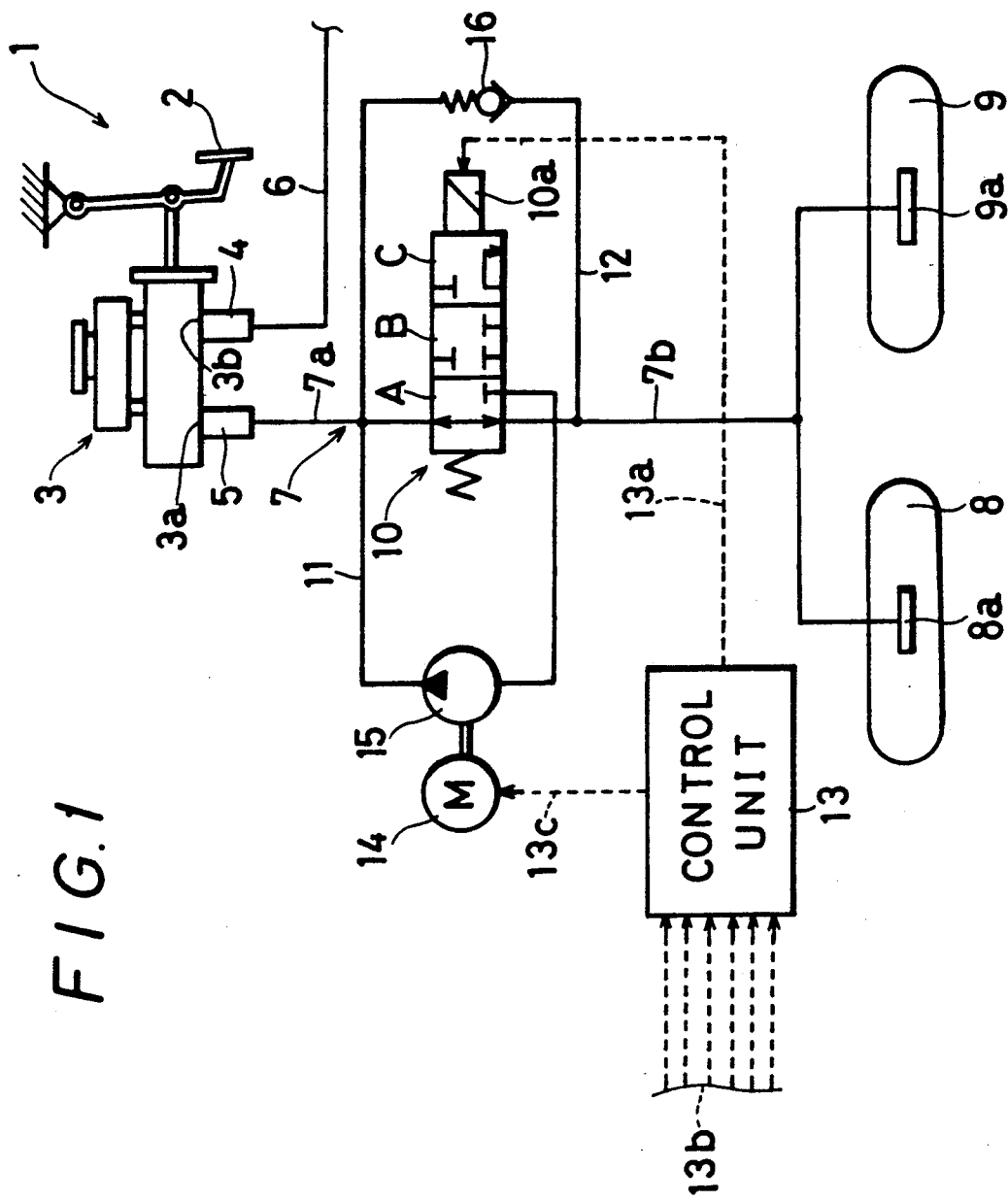
FIG. 1 is a schematic view showing the whole of an anti-skid braking system for vehicle according to an embodiment of this invention.

Next, an anti-skid braking system according to an embodiment of this invention will be described with reference to the drawings.

First, the whole of the anti-skid braking system will be described with reference to FIG. 1. The system is generally represented by a reference numeral 1. A brake pedal 2 is connected to a tandem master cylinder 3 which has a well-known construction, and has two independent fluid pressure chambers. When the brake pedal 2 is trodden, fluid pressures are generated in the fluid pressure chambers. Pulsating-pressure-damping or absorbing apparatus 4 and 5 are screwedly fixed to outlet portions 3b and 3a communicating with the fluid pressure chambers of the tandem master cylinder 3, respectively.

One of the fluid pressure chambers is connected through the one pulsating-pressure absorbing apparatus 4 and a conduit 6 to not-shown front left and right wheel brake apparatus. The other of the fluid pressure chambers is connected through the other pulsating-pressure absorbing apparatus 5 and a conduit 7 to wheel cylinders 8a and 9a of rear left and right wheels 8 and 9.

The conduit 7 consists of a conduit portion 7a and another conduit portion 7b. An anti-skid control value 10 is arranged between the conduit portions 7a and 7b. A brake relieving circuit 11 is connected between the anti-skid control valve 10 and the conduit portion 7a. An auxiliary circuit 12 is connected between the conduit portions 7a and 7b in parallel with anti-skid control valve 10.

The anti-skid control value 10 is a three-position three-port electro-magnetic valve. An output terminal 13a of a control unit 13 is connected to a solenoid portion 10a of the electro-magnetic valve 10. Not-shown wheel speed sensors associated with the wheels are connected to input terminals 13b of the control unit 13. It evaluates and measures skid conditions or rotational behaviours of the wheels on the bases of the output signals of the wheel speed sensors.

In a position A for brake-increasing, the conduit portions 7a and 7b are made to communicate with each other and the brake relieving circuit 11 is cut off, by the anti-skid control value 10. In a position B for brake-holding, the conduit portions 7a and 7b are cut off from each other, and the brake relieving circuit 11 is cut off, by the anti-skid control value 10. And in a position C for brake-relieving, the conduit portions 7a and 7b are cut off from each other, while the conduit portion 7b is made to communicate with the brake relieving circuit 11, by the anti-skid control valve 10.

A fluid pressure pump 15 is connected in the brake relieving circuit 11, and it is driven by an electric motor 14 to which a drive signal is supplied from an output terminal 13c of the control unit 13. Brake fluid discharged through the anti-skid control valve 10 from the wheel cylinders 8a and 9a is pressurized and returned to the side of the master cylinder 3 by the fluid pressure pump 15. A check valve 16 is connected in the auxilily circuit 12, and it permits fluid to flow only from the side of the wheel cylinders 8a and 9a towards the side of the master cylinder 3.

In FIG. 1, an anti-skid braking apparatus for the front left and right wheels is omitted. The apparatus shown in FIG. 1 is provided for the front left and right wheels. However, the one fluid pressure pump 15 is commonly used for the rear and front wheels, and the pressurized brake fluid from the wheel cylinders of the front and rear wheels is returned to the master cylinder 3 by the one fluid pressure pump 15.

Next, the details of the pulsating-pressure absorbing apparatus 4 and 5 will be described with reference to FIG. 2 and FIG. 3. The apparatus 4 and 5 are equal to each other in construction. Accordingly, only one 5 of them will be described hereinafter.

In the pulsating-pressure absorbing apparatus 5, a main body 20 is screwedly fixed to the outlet portion 3a of the tandem master cylinder 3 at a threaded portion 21. A seal ring 22 is fitted to the main body 20 at a stepped portion near the threaded portion 21. The pulsating-pressure absorbing apparatus 5 is liquid-tightly fixed to the outlet portion 3a of the tandem master cylinder 3, by the seal ring 22.

A connecting hole 23 for the conduit portion 7a (FIG. 1) is formed at the opposite side to the threaded portion 21 in the main body 20. A stepped hole 24 communicating with the connecting hole 23 and alighned with the latter is formed in the main body 20, and it is reduced steppedly towards the connecting hole 23 in diameter. A small-diameter hole portion 25 is nearest to the connecting hole 23. An intermediate-diameter hole portion 27 is formed continuously formed though a stepped portion 26. A tapered portion 28 and a first large diameter portion 29 are continuously formed at the right side of the intermediate-diameter hole portion 27. Further, a second tapared portion 30 and a second large diameter hole portion 31 are continuously formed at the right side of the first large diameter hole portion 29. And an opening end portion 33 is formed through a stepped portion 32 next to the second large diameter hole portion 31.

A radial path 34 is formed in communication with the intermediate diameter hole portion 27 in the main body 20. An annular grove 36 is formed in communication with the radial path 34 in the peripheral wall of the main body 20. A rubber cover ring 35 is fitted to the annular groove 36 for closing the radial path 34, so that foreign material such as dust particles can be prevented from invading the interior of the main body 20 from the outside. However, it permits drain to leak to the outside and air to flow to the outside.

A stepped plunger 42 is slidably fitted into the stepped hole 24 of the main body 20. Rubber seal rings 45 and 46 are tightly fitted to the stopped plunger 42 at a smaller diameter portion 40 and a larger diameter portion 41 respectively, which are slidably fitted to the smaller diameter hole portion 25 of the stepped hole 24 and the first large diameter hole position 29 thereof, respectively.

The opening end portion 33 of the main body 20 is caulked and deformed as shown. A disk 43 having holes 43a is fixed at the thus deformed opening end portion 33. A return spring 44 is compressedly extended between the disk 43 and the large diameter portion 41 of the stepped plunger 42. Accordingly, the stepped plunger 42 is urged towards the connecting hole 23. The spring force of the return spring 44 is weak. However, it overcomes slide resistances of the seal rings 45 and 46 against the inside wall of the main body 20. In the stapped plunger 42, an intermediate portion 47 is formed adjacent to the larger portion 41. The diameter of the intermediate portion 47 is slightly smaller than that of the intermediate hole portion 27 of the stepped hole 24.

Figure 2:
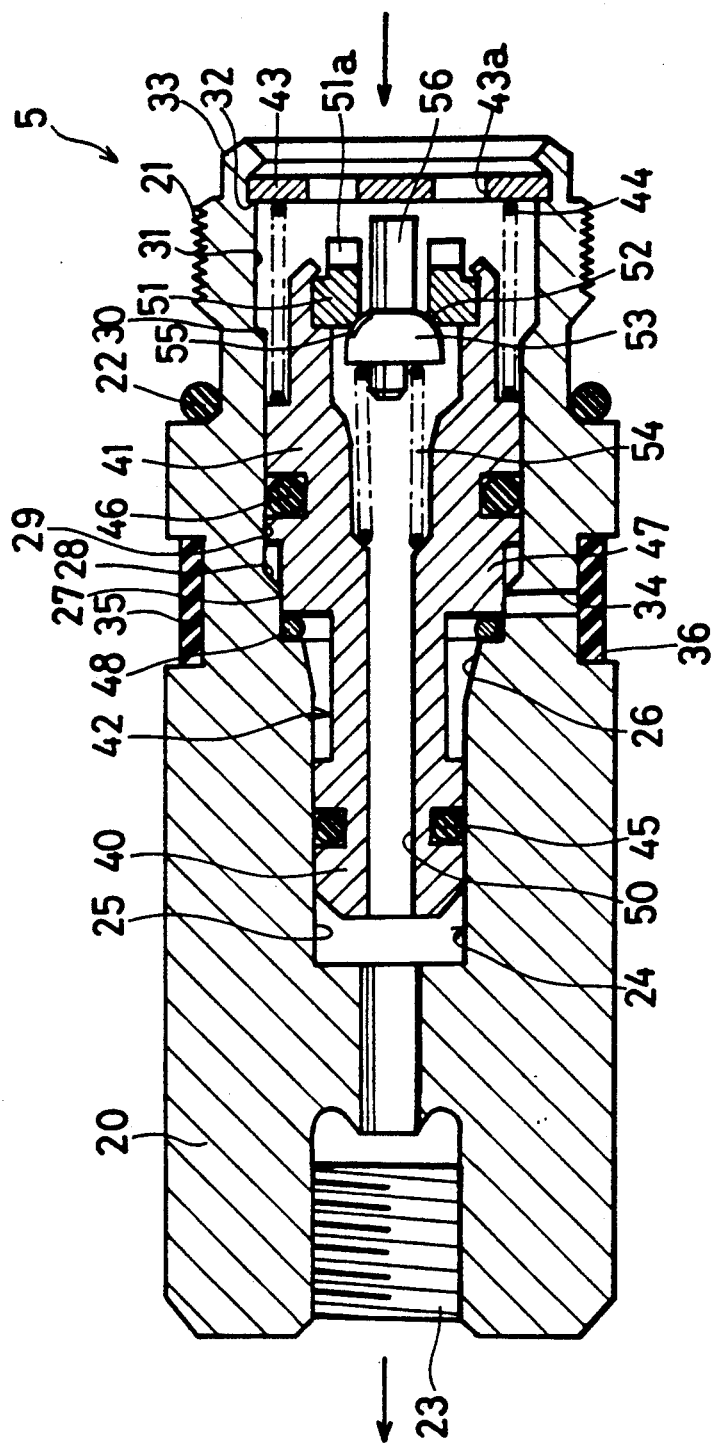
FIG. 2 is an enlarged cross-sectional view of a pulsating-pressure absorbing apparatus in FIG. 1, under the normal condition in which the inside of the anti-skid braking system is filled with brake fluid.
Figure 3:
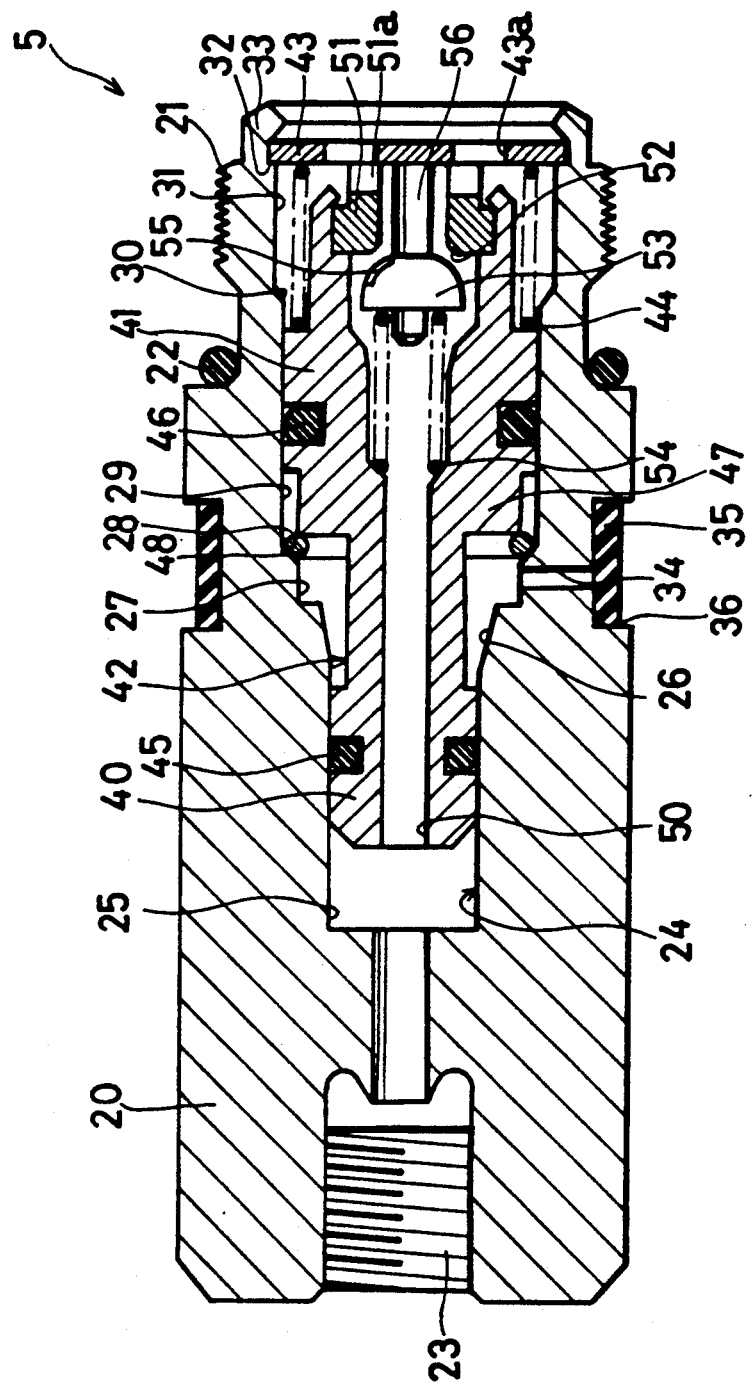
FIG. 3 is an enlarged cross-sectional view of the pulsating-pressure absorbing apparatus of FIG. 2, under the initial condition in which the inside of the anti-skid braking system is not yet filled with brake fluid.

A C-shaped spring member 48 made of spring wire material is arranged between the intermediate hole portion 27 of the stepped hole 24 and the intermediate portion 47 of the stepped plunger 48, and it is under almost natural condition or natural diameter in FIG. 3. In the natural condition, the outer diameter of the diameter of the intermediate hole portion 27 of the stepped hole 24. The inner diameter thereof is slightly smaller than the diameter of the intermediate portion 47 of the stepped plunger 42. The spring force of the spring member 45 is so large that it cannot be easily deformed by the spring force of the return spring 44. Until a strong pushing force towards the connecting hole 23 is applied to the stepped plunger 42, the C-shaped spring member 48 is engaged with the tapered stepped portion 28 of the stepped hole 24 and the shoulder portion of the intermediate portion 47 of the stepped plunger 42, so that the stepped plunger 42 can be held at the right position shown in FIG. 3. When the strong pushing force is applied leftwards to the stepped plunger 42, the C-shaped spring member 48 is moved along the tapered stepped pertion 28 and it is so deformed that the diameter of the spring member 48 is decreased, and at last it comes to contact with the stepped portion 26 as shown in FIG. 2. Hereafter, the C-shaped spring member 48 is maintained at the stepped portion 26 as shown in FIG. 2. It has no influence on the normal braking operation. When the stepped plunger 42 is moved leftwards in the normal braking operation, the spring member 48 and the plunger 42 contact merely with each other. Thus, it functions merely as a contact portion for the plunger 42.

A stepped through hole 50 is axially formed in the plunger 42. A cylindrical valve-seat member 51 is fixed to the right opening end of the stepped through hole 50 by caulking. The inner peripheral edge portion of the valve seat member 51 functions as a value seat 52. A poppet-type valve body 53 is arranged in the stepped through hole 50 in face to the valve seat 52, and it is urged to the valve seat 52 by a valve spring 54 the spring force of which is weak. Accordingly, it normally contacts with the valve-seat 52.

Cut-out paths 51a are formed in the end of the valve seat member 51. The valve seat member 51 and the valve body 53 are made of metallic material of the iron group, and they are hardened by the quenching treatment in the manufacturing step. The hardness of them is considerables large. A throttle cut-out groove 55 is formed in the head portion of the valve body 53 contacting with the valve seat 52. It has the V-shaped or U-shaped cross-section the area of which correspond to that of the circular cross-section of 3 to 5 mm diameter. The area and shape of the throttle cut-out groove 55 are selected by the required absorbing effect.

A rod portion 56 is formed integrally with the valve body 53, and it passes through the valve seat member 51. When the stepped plunger 42 is moved to the disk 43 against the return spring 44, also the rod portion 56 of the valve body 53 contacts with the disk 43. Accordingly, the valve body 53 is separated from the valve seat 52. The separation distance or valve lift between the valve body 53 and the valve seat 52 is sufficiently long. The length of the rod portion 56 of the valve body 53 is so large as to obtain the above separation distance or valve lift. It is preferable that the flow resistance in the valve lift is as low as that of a usual conduit such as the conduit portion 7a. The ratio of the effective pressure-receiving area of the smaller-diameter portion 40 at the side of the connecting hole 23, to the effective pressure-receiving area of the larger-diameter portion 41 at the side of the master cylinder 3 in the plunger 42 is $\frac{1}{2}$. Thus, the former area: the latter area= 1:2. Assuming that the static pressure of 50 kgf/cm$^2$ is applied to the plunger 42, the latter is not moved unless the width of the pulsating pressure at the side of the connecting hole 23 becomes higher than 50 kgf/cm$^2$. The ratio of the effective pressure-receiving area of the smaller-diameter portion to the effective pressure receiving area of the larger-diameter portion is suitably selected by the width of the pulsating pressure depending on the kind of the vehicle provided with the shown apparatus.

Next, there will be described operations of the above described anti-skid apparatus 1.

First, general operations of the whole of the apparatus shown in FIG. 1 will be described.

When the brake pedal 2 is trodden, fluid pressures are generated in the not-shown-fluid pressure chamers of the tandem master cylinder 3 and they are supplied through the pulsating-pressure receiving apparatus 4 and 5 to the conduits 6 and 7. The anti-skid control valve 10 is taking the position A for brake increasing. Accordingly, they are supplied to the wheel cylinders 8a and 9a of the rear wheels 8 and 9 and to the not-shown wheel cylinders of the front wheels. The wheels are braked.

When the wheels tend to skid and the control unit 13 judges the brakes of the wheels to be relieved, the control unit 13 supplies a brake-decreasing instruction to the valve 10 and a motor drive signal to the motor 14. The pressure at the side of the master cylinder 3 increases to a pressure depending on the treading force to the brake pedal 2. However, since the valve 10 is changed over to the position C by the brake-relieving instruction, a part of the brake fluid supplied to the wheel cylinders 8a and 9a is discharged into the brake relieving circuit 11 through the valve 10. When the wheels are released from skidding, the control unit 13 stops the brake relieving instruction and generates a brake holding instruction. Thus, the valve 10 is changed over to the position B for brake holding. The fluid pressures of the wheel cylinders 8a and 9a are maintained at constant.

The fluid pressure pump 15 is driven by the motor 14, and pressurizes and returns the brake fluid discharged from the wheel cylinders 8a and 9a through the valve 10, to the side of the master cylinder 3. When the fluid pressure pump 15 is of the plunger type, the fluid pressure is intermittently supplied to the conduit portion 7a. However, the pulsating pressure is absorbed and then the brake fluid is returned to the master cylinder 3.

Hereafter, when the wheels are released much from skid conditions and the rotational speeds of the wheels are considerably recovered, the control unit 13 changes over the valve 10 into the position A for brake increasing, and the brake fluid is supplied from the master cylinder 3 into the wheel cylinders 8a and 9a. The braking forces to the wheels increase.

Hereafter, the valve 10 is so changed over as that the wheels do not skid. The decrease, holding and increasing of the fluid pressure are repeated in accordance with the instructions from the control unit 13. When the brake pedal 2 is released from treading, the brake fluid is returned though the check valve 16 from the wheel cylinders 8a and 9a to the master cylinder 3. It is returned also through the valve 10 after the end of the anti-skid control.

Next, operations of the pulsating-pressure absorbing apparatus 5 during the anti-skid control will be described.

FIG. 2 shows the stationary condition when the brake is applied and when no brake is applied.

When no brake is applied, no fluid pressure is applied to the stepped plunger 42. It contacts at the intermediate diameter portion 47 with the stepped portion 26 through the spring member 48 by the urging force of the spring 44. Accordingly, the rod portion 56 of the valve body 53 is separated from the disk 43, and the valve body 53 contacts with the valve seat 52.

In the condition shown in FIG. 2, when the pressurized fluid is supplied from the master cylinder 3, it separates the valve body 53 from the valve seat 52, and it flows through the through hole 50. Since the fluid-pressure receiving area of the plunger 42 is larger at the side of the master cylinder 3 than at the side of the conduit portion 7a, the plunger 42 is not moved from the shown position.

With the start of the anti-skid operation, the discharging pressure of the fluid pressure pump 15 is transmitted into the connecting hole 23. It is pulsating. With respect to the valve body 53, the fluid pressure at the side of the connecting hole 23 is higher than the fluid pressure at the side of the master cylinder 3. Accordingly, the brake fluid flows from the connecting hole 23 towards the master cylinder 3 though the throttle groove 55. At that time, the pulsating pressure is attenuated by the throttling effect of the throttle groove 55. The pulsating pressure of the fluid pressure pump 15 includes the pressure increase due to the returned fluid to the master cylinder 3. However, the plunger 42 is not moved against the return spring 44, since there is the predetermined difference between the pressure-receiving areas of the plunger 42 at both of the sides. Accordingly, the pulsating pressure due to the movement of the plunger 42 is prevented from generating. Thus, the pulsating pressure of the brake fluid from the fluid pressure pump 15 is attenuated and the brake fluid from the fluid pressure pump 15 is returned to the master cylinder 3. Although the brake pedal 2 is pushed backwards by the returned fluid, the pedal feeling is considerably good, since the pulsating pressure is greatly attenuated.

When the brake pedal 2 is released from treading, the pressure at the inside of the master cylinder 3 rapidly decreases and becomes negative. At the same time, the pressure at the side of the master cylinder 3 decreases remarkably with respect to the throttle groove 55. As the occasion demands, it becomes negative. The plunger 42 rapidly moves rightwards. The rod portion 56 of the valve body 53 contacts with the disk 43, and the valve seat member 51 contacts with the disk 43. Thus, the valve body 53 is separated from the valve seat 52. The brake fluid returns freely through the large gap between the valve body 53 and the valve seat 52 into the master cylinder 3. Accordingly, although the special check valve is not used, the brake can be rapidly relieved.

When the brake is perfectly relieved, the plunger 42 returns to the shown original position by the urging force of the return spring 44.

Next, there will be described operations of the pulsating-pressure absorbing apparatus 5 in the assembling step to the vehicle, with reference to FIG. 3.

Generally, air is substituted with brake fluid in the respective parts of the brake apparatus, by the air-bleeding operation immediately after the assembly step. In this embodiment, the air-bleeding operation called "Vacuum bleeding method" is employed. Air is sucked from the opening of the hydraulic reservoir provided in the master cylinder 3, by a vacuum pump. When air is sufficiently sucked and the degree of the vacuum becomes considerable high, brake fluid to which back-pressure is applied, is supplied into the brake apparatus.

In the air bleeding operation, if air flows towards the master cylinder 3 only through the throttle groove 55, long time is required. The time of the air flow can be shortened mainly by function of the spring member 48.

The pulsating-pressure absorbing apparatus 5 takes the situation as shown in FIG. 3 immediately after it is assembled into the vehicle. The intermediate diameter portion 47 of the plunger 42 is engaged through the spring member 48 with the tapered step portion 28 of the stepped hole 24. The plunger 42 is so positioned that the valve seat member 51 fixed to the end of the plunger 42 contacts with, or separates slightly from the disk 43. The rod portion 56 of the valve body 53 contacts with the disk 43. Accordingly the valve body 53 is further separated from the valve seat 52.

When the air-bleeding operation of the vacuum bleeding method is effected in the situation shown in FIG. 3, air flows rapidly from the side of the conduit 7 towards the master cylinder 3 through the large gap between the valve body 53 and the valve seat 52. After air is sufficiently sucked, brake fluid with back pressure is supplied into the pulsating-pressure absorbing apparatus 5. The pressure of the brake fluid is applied to the larger diameter portion 41 of the plunge 42. Thus, it is pushed strongly towards the connecting hole 23. The spring member 48 is moved along the tapered step portion 28. It is so deformed and shrinked that its outer diameter is decreased to a diameter which is substantially equal to the diameter of the intermediate hole portion 27. As the result, the spring member 48 is so pushed that it contacts with the stepped portion 26. On the other hand, the inside of the brake apparatus is filled with brake fluid to which back pressure is applied. Thus, the air-bleeding operation is finished.

While the preferred embodiment has been described, variations thereto will occur to those skilled in the art within the scope of the present inventive concepts which are delineated by the following claims.

For example, a low-pressure accumulator or a hydraulic reservoir may be arranged at the suction side of the fluid pressure pump 15 for reserving the brake fluid discharged though the valve 10 from the wheel cylinders 8a and 9a.

Further, in the above embodiment, the one three-position, three-port electro-magnetic valve is used as the anti-skid control valve 10. Insteads, two two-position, two-port electromagnetic valves may be used as the anti-skid control valve 10.

Further, a frictional ring may be fitted at the predetermined position instead of the spring member 48. It is preferrable that the fictional ring is made of synthetic resin for damping the impact force and preventing impact noise on impacting the plunger 42.

Further, the disk 43 having plural holes 43a may be coated with rubber film or film of synthetic resin in order to damp the impact force and impact noise on the impact of the plunger 42 and valve body 53 to the disk 43. Or any one of the plunger 42, valve body 53 and disk 43 may be made of the so-called "vibration-absorbing or shock-absorbing steel" including much copper, lead or the like. At this case, it is preferrable that the disk 43 is made of the shock-absorbing steel. Or a noise-preventing plate may be arranged adjacent to the disk 43 at the side of the plunger 42.

Further in the above embodiment, the plunger 42 as a movable member is urged towards the connecting hole 23 by the return spring 44, and so the movable member is normally located at the output side, or at the side of the connecting hole 23. Insteads, the return spring 44 may be omitted so that the movable member is moved freely in responce to the fluid pressure difference or the flow of the brake fluid. At that case, there may be no difference between the right and left fluid-pressure receiving areas of the plunger 42.

Or the movable member may be urged towards the side of the connecting hole 23 by a relatively strong spring and further there may be no difference between the right and left pressure-receiving areas of the plunger.

Further in the above embodiment, the valve body 53 with the throttle cut groove 55 is assembled into the plunger 42. Instead, a valve body with throttle cut groove may be independently arranged at the side of the outlet or inlet of the main body 20 so that it is operated in responce to the movement of the plunger 42.

What is claimed is:
1. A braking system for a vehicle, comprising:
(A) a brake fluid pressure generating source;
(B) a brake-applying apparatus for braking a wheel or wheels with the brake fluid pressure supplied from said brake fluid pressure generating source;
(C) a pulsating-pressure absorbing apparatus arranged between said brake fluid pressure generating source and said brake-applying apparatus; and,
(D) throttling means arranged in said pulsating-pressure absorbing apparatus, for limiting the brake fluid flowing from the side of said brake-applying apparatus towards said brake fluid pressure generating source, wherein said pulsating-pressure absorbing apparatus further comprises a main body, a plunger slidably fitted through a hole of said main body and being arranged between the inlet and outlet of said main body and further being movable in response to the brake fluid pressure difference between both sides of said plunger, a poppet-type valve body arranged in an axial hole of said plunger and in the inside wall of said plunger, a spherical head portion of said valve body being contactable with said valve seat, a rod portion of said valve body passing through a narrow end portion of said axial hole and said throttle means being formed as a cut-off groove in said spherical head portion of the valve body, wherein when said plunger is located at the first side of said outlet said spherical head portion of the valve body contacts with said valve seat and said cut-out groove functions as a throttle between said spherical head portion of the valve body and said valve seat, and wherein when said plunger is located at the second side of said inlet said spherical head portion of the valve body is separated from said valve seat.

2. A braking system according to claim 1 wherein said pulsating-pressure absorbing apparatus is fixed to the outlet of said brake pressure generating source.

3. A braking system for a vehicle comprising:
(A) a brake fluid pressure generating source;
(B) a brake-applying apparatus for braking a wheel or wheels with the brake fluid pressure supplied from said brake fluid pressure generating source;
(C) a pulsating-pressure absorbing apparatus arranged between said brake fluid pressure generating source and said brake-applying apparatus; and
(D) throttling means arranged in said pulsating-pressure absorbing apparatus, for limiting the brake fluid flowing from the side of said brake-applying apparatus towards said brake fluid pressure generating source, the improvements in which said pulsating-pressure absorbing apparatus including a movable member arranged between the inlet and outlet of said pulsating-pressure absorbing apparatus and being movable in response to the brake fluid pressure difference between both sides of said movable member, wherein when said movable member is located at the first side of said outlet said throttling means becomes operative, wherein when said movable member is located at the second side of said inlet, said throttling means becomes inoperative, and holding means for forcibly positioning said movable member at said second side before the inside of said braking system is filled with brake fluid in the assembling step to said vehicle.

4. A braking system according to claim 3, wherein said pulsating-pressure absorbing apparatus further comprises a main body, wherein said movable member is a plunger, a valve body arranged in an axial hole of said plunger and a valve seat formed integrally with said plunger, wherein said valve body is contactable with said valve seat and said throttle means is formed as a cut-out groove in said valve body, and wherein when said plunger is located at said first side said valve body contacts with said valve seat and said cut-out groove functions as throttle between said valve body and said valve seat.

5. A braking system according to claim 3, in which said holding means is a C-shaped spring member which is engaged with a part of said plunger and a stepped portion of the inner wall of said through hole of the main body.

6. A braking system for a vehicle comprising:
(A) a master cylinder;
(B) a wheel cylinder for braking a wheel with the brake fluid pressure supplied from said master cylinder;

(C) an anti-skid control valve apparatus arranged between said master cylinder and said wheel cylinder and changed over in accordance with instructions generated from a control unit for evaluating or measuring a skid condition or behavior of said wheel;

(D) a brake relieving circuit one end of which communicates with said master cylinder and another end of which communicates with said anti-skid control valve apparatus;

(E) a fluid pressure pump arranged in said brake relieving circuit for pressurizing and returning the brake fluid discharged through said anti-skid control valve apparatus from said wheel cylinder;

(F) a pulsating-pressure absorbing apparatus arranged between said fluid pressure pump and said master cylinder for limiting the transmission of the pulsating pressure of said fluid pressure pump; and (G) throttling means arranged in said pulsating-pressure absorbing apparatus for limiting the brake fluid flowing from the side of said fluid pressure pump towards said master cylinder, the improvements in said pulsating-pressure absorbing apparatus including a main body, a plunger slidably fitted to a through hole of said main body being arranged between the inlet and outlet of said main body and being movable in response to the brake fluid pressure difference between both sides of said plunger, a poppet-type valve body arranged in an axial hole of said plunger, and in the inside wall of said plunger, a spherical head portion of said valve body being contactable with said valve seat wherein, a rod portion of said valve body passes through a narrow end portion of said axial hole, wherein said throttle means is formed as a cut-out groove in said spherical head portion of the valve body, wherein when said plunger is located at the first side of said outlet, said spherical head portion of the valve body contacts with said valve seat and said cut-out groove functions as throttle between said spherical head portion of the valve body and said valve seat, and wherein when said plunger is located at the second side of said inlet, said spherical head portion of the valve body is separated from said valve seat.

7. A braking system according to claim 6 wherein said pulsating-pressure absorbing apparatus is fixed to the outlet of said master cylinder.

8. A braking system for a vehicle comprising:

(A) a master cylinder;

(B) a wheel cylinder for braking a wheel with the brake fluid pressure supplied from said master cylinder;

(C) an anti-skid control valve apparatus being arranged between said master cylinder and said wheel cylinder and changed over in accordance with instructions generated from a control unit for evaluating or measuring a skid condition or behavior of said wheel;

(D) a brake relieving circuit one end of which communicates with said master cylinder and another end of which communicates with said anti-skid control valve apparatus;

(E) a fluid pressure pump arranged in said brake relieving circuit for pressurizing and returning the brake fluid discharged through said anti-skid control valve apparatus from (F) a pulsating-pressure absorbing apparatus arranged between said fluid pressure pump and said master cylinder for limiting the transmission of the pulsating pressure of said fluid pressure pump; and (G) throttling means arranged in said pulsating-pressure absorbing apparatus for limiting the brake fluid flowing from the side of said fluid pressure pump towards said master cylinder, the improvements in said pulsating-pressure absorbing apparatus further comprising a movable member arranged between the inlet and outlet of said pulsating-pressure absorbing apparatus and being movable in response to the brake fluid pressure difference between both sides of said movable member, wherein when said movable member is located at the first side of said outlet wherein said throttling means becomes operative, wherein when said movable member is located at the second side of said inlet, said throttling means becomes inoperative, and holding means for forcibly positioning said movable member at said second side, before the inside of said braking system is filled with brake fluid in the assembling step to said vehicle.

9. A braking system according to claim 8 wherein said pulsating-pressure absorbing apparatus further comprises a main body, a plunger slidably fitted to a through hole of said main body, wherein said movable member is a plunger, a valve body arranged in an axial hole of said plunger and a valve seat formed integrally with said plunger, wherein said valve body is contactable with said valve seat and said throttle means is formed as a cut-out groove in said valve body, and wherein when said plunger is located at said first side, said valve body contacts with said valve seat and said cut-out groove functions as throttle between said valve body and said valve seat.

10. A braking system according to claim 9 wherein said holding means is a C-shaped spring member which is engaged with a part of said plunger and a stepped portion of the inner wall of said through hole of the main body.

* * * * *

UNITED STATES PATENT AND TRADEMARK OFFICE
CERTIFICATE OF CORRECTION

PATENT NO. : 5,020,864

DATED : June 4, 1991

INVENTOR(S) : Ryuichi Tanaka

It is certified that error appears in the above-identified patent and that said Letters Patent is hereby corrected as shown below:

```
In The Abstract, line 12, "sdes" should be --sides--
Column 1, line 20, "throtting" should be --throttling--
Column 1, line 21, "limitting" should be --limiting--
Column 1, line 41, "limitting" should be --limiting--
Column 1, lines 43-44,"throtting" should be --throttling--
Column 1, line 43, "limitting" should be --limiting--
Column 2, line 27, "limitting" should be --limiting--
Column 2, line 33, "responce" should be --response--
Column 2, line 58, "limitting" should be --limiting--
Column 2, line 61, "limitting" should be --limiting--
Column 2, line 66, "responce" should be --response--
Column 3, line 50, "value" should be --valve--
Column 3, line 57, "value" should be --valve--
Column 4, line  1, "value" should be --valve--
Column 4, line  4, "value" should be --valve--
Column 4, line 16, "auxilily" should be --auxiliary--
Column 4, line 44, "alighned" should be --aligned--
Column 4, line 53, "tapared" should be --tapered--
Column 4, line 61, "grove" should be --groove--
Column 5, line 19, "stapped" should be --stepped--
Column 5, line 27, "stepped plunger 48" should be
     --stepped plunger 42--
Column 5, line 45, "pertion" should be --portion--
Column 5, line 59, "value" should be --valve--
Column 6, line  2, "considerables" should be --considerably--
Column 6, line 41, "chamers" should be --chambers--
Column 8, line 29, "considerable" should be --considerably--
Column 8, line 54, "plunge" should be --plunger--
Column 9, line  8, "Insteads," should be --Instead,--
Column 9, line 13, "fictional" should be --frictional--
Column 9, line 31, "Insteads," should be --Instead,--
Column 9, line 33, "responce" should be --response--
```

UNITED STATES PATENT AND TRADEMARK OFFICE
CERTIFICATE OF CORRECTION

PATENT NO. : 5,020,864

DATED : June 4, 1991

INVENTOR(S) : Ryuichi Tanaka

It is certified that error appears in the above-identified patent and that said Letters Patent is hereby corrected as shown below:

Column 9, line 47, "responce" should be --response--.

Signed and Sealed this

Twenty-third Day of March, 1993

*Attest:*

STEPHEN G. KUNIN

*Attesting Officer*  *Acting Commissioner of Patents and Trademarks*